United States Patent
Liu

(10) Patent No.: US 9,888,726 B2
(45) Date of Patent: Feb. 13, 2018

(54) ELECTRONIC CIGARETTE BATTERY ASSEMBLY

(71) Applicant: HUIZHOU KIMREE TECHNOLOGY CO., LTD. SHENZHEN BRANCH, Shenzhen, Guangdong (CN)

(72) Inventor: Qiuming Liu, Guangdong (CN)

(73) Assignee: HUIZHOU KIMREE TECHNOLOGY CO., LTD. SHENZHEN BRANCH, Shenzhen, Guangdong (CN)

( * ) Notice: Subject to any disclaimer, the term of this patent is extended or adjusted under 35 U.S.C. 154(b) by 0 days.

(21) Appl. No.: 15/245,527

(22) Filed: Aug. 24, 2016

(65) Prior Publication Data

US 2016/0360793 A1 Dec. 15, 2016

Related U.S. Application Data

(63) Continuation of application No. PCT/CN2014/073342, filed on Mar. 13, 2014.

(30) Foreign Application Priority Data

Feb. 27, 2014 (CN) ............... 2014 2 0086547 U

(51) Int. Cl.
*A24F 47/00* (2006.01)
*H01M 10/44* (2006.01)
(Continued)

(52) U.S. Cl.
CPC ......... *A24F 47/008* (2013.01); *H01M 2/1055* (2013.01); *H01M 2/20* (2013.01);
(Continued)

(58) Field of Classification Search
CPC ..... H01M 2010/4271; H01M 2220/30; H01M 2/1055; H01M 10/44
See application file for complete search history.

(56) References Cited

U.S. PATENT DOCUMENTS 4,771,796 A * 9/1988 Myer .................... A24F 47/002
131/273
8,997,753 B2 * 4/2015 Li .......................... H01C 17/00
128/202.21
(Continued)

FOREIGN PATENT DOCUMENTS

CN 101371721 A 2/2009
CN 102916461 U 2/2013
(Continued)

OTHER PUBLICATIONS

International Search Report for PCT/CN2014/073342, dated Nov. 24, 2014, ISA/CN.
(Continued)

*Primary Examiner* — Briggitte R Hammond
(74) *Attorney, Agent, or Firm* — U.S. Fairsky LLP; Yue Xu

(57) ABSTRACT

An electronic cigarette battery assembly, including a charging electrode, the charging electrode including an inner electrode arranged on the inner rim thereof and having a spherical cap end face, and an outer electrode arranged outside the inner electrode and having a ring shape; the charging electrode and the rechargeable battery of the electronic cigarette being connected by means of a control module, when it is necessary to charge the rechargeable battery, one need only connect the charging electrode to the electric power output terminal of the external charger in order to charge the rechargeable battery. There is no need to remove the rechargeable battery, thus the invention is very convenient to use and solves the problems of existing (Continued)

electronic cigarettes, wherein it is inconvenient to remove a rechargeable battery for charging and the electrical connection is unreliable due to loosening of the battery.

14 Claims, 3 Drawing Sheets

(51) Int. Cl.
    *H01M 2/10*     (2006.01)
    *H01M 2/20*     (2006.01)
    *H01M 10/42*     (2006.01)

(52) U.S. Cl.
    CPC .... *H01M 10/44* (2013.01); *H01M 2010/4271* (2013.01); *H01M 2220/30* (2013.01)

(56) References Cited

U.S. PATENT DOCUMENTS

| | | | | |
|---|---|---|---|---|
| 9,516,898 | B2* | 12/2016 | Liu | A24F 47/008 |
| 9,597,466 | B2* | 3/2017 | Henry, Jr. | A61M 15/06 |
| 2007/0273327 | A1* | 11/2007 | Daniel | H01M 2/105 |
| | | | | 320/110 |
| 2008/0257367 | A1* | 10/2008 | Paterno | A24F 47/008 |
| | | | | 131/328 |
| 2011/0011396 | A1* | 1/2011 | Fang | A24F 47/008 |
| | | | | 128/202.21 |
| 2011/0304282 | A1* | 12/2011 | Li | A24F 47/008 |
| | | | | 315/362 |
| 2013/0042865 | A1* | 2/2013 | Monsees | A61M 15/06 |
| | | | | 128/203.27 |
| 2013/0336358 | A1 | 12/2013 | Liu | |
| 2013/0340779 | A1* | 12/2013 | Liu | A24F 47/002 |
| | | | | 131/329 |
| 2014/0014124 | A1* | 1/2014 | Glasberg | A24F 47/008 |
| | | | | 131/328 |
| 2014/0096782 | A1* | 4/2014 | Ampolini | A24F 47/008 |
| | | | | 131/328 |
| 2014/0352705 | A1 | 12/2014 | Liu | |
| 2015/0000684 | A1* | 1/2015 | Wu | A24F 47/008 |
| | | | | 131/329 |
| 2015/0164142 | A1* | 6/2015 | Li | F22B 1/288 |
| | | | | 131/329 |

FOREIGN PATENT DOCUMENTS

| | | |
|---|---|---|
| CN | 203194538 U | 9/2013 |
| CN | 203326580 U | 12/2013 |
| CN | 203351684 U | 12/2013 |
| CN | 203386835 U | 1/2014 |
| CN | 203415639 U | 1/2014 |
| CN | 203416810 U | 2/2014 |
| CN | 203434706 U | 2/2014 |
| WO | 2013093695 A1 | 6/2013 |
| WO | 2013185358 A1 | 12/2013 |
| WO | 2014008646 A1 | 1/2014 |

OTHER PUBLICATIONS

European Search Report for 14884032.5-1360/3113250 PCT/CN2014/073342, dated Aug. 10, 2017.

* cited by examiner

ELECTRONIC CIGARETTE BATTERY ASSEMBLY

CROSS-REFERENCE TO RELATED APPLICATION

This application is a continuation of International Application No. PCT/CN2014/073342, titled "ELECTRONIC CIGARETTE BATTERY ASSEMBLY", filed on Mar. 13, 2014, which claims the benefit of priority to Chinese patent application No. 201420086547.3, titled "ELECTRONIC CIGARETTE BATTERY ASSEMBLY", filed with the Chinese State Intellectual Property Office on Feb. 27, 2014, the entire disclosures of which are incorporated herein by this reference.

FIELD

The present application relates to the field of electronic cigarettes, and in particular to an electronic cigarette battery assembly.

BACKGROUND

An electronic cigarette, also referred to as a virtual cigarette or an electronic tobacco cigarette, is an alternative to a conventional smoke, which is mainly used for quitting smoking and replacing the conventional smoke. The electronic cigarette has a same appearance and substantially a same taste with the conventional smoke, and even has more taste than the conventional smoke. The electronic cigarette, when smoked, can create smoke, taste and feel just like the conventional smoke. Further, the electronic cigarette has no harmful ingredients in the conventional smoke, such as tar, suspended particles, etc., and also would not create diffuse or wreathing second-hand smoke. Therefore, the electronic cigarette would not cause harm to a smoker and other person.

As shown in FIG. 1, a conventional electronic cigarette includes an atomizing assembly 20 and a battery assembly 10 which are connected together. The electronic cigarette has a battery 11 arranged in the battery assembly 10. A cap is provided on an end 13, which is far away from the atomizing assembly 20, of the battery assembly. For the purpose of facilitating a reuse, a rechargeable battery may be employed as the battery 11. When the rechargeable battery 11 runs out, the rechargeable battery 11 is required to be removed out of the battery assembly 10 to be charged. However, this would make the rechargeable battery 11 to be removed out of and put into the battery assembly 10 frequently. The atomizing assembly 20 is detached from the battery assembly 10 to allow the rechargeable battery 11 to be charged from one end of the battery assembly 10 which is connected to the atomizing assembly 20. However, this would make the use of the electronic cigarette inconvenient. Also, disassembling the atomizing assembly 20 and the battery assembly 10 frequently would easily lead to a problem of an unreliable electric connection between the atomizing assembly 20 and the battery assembly 10 due to the loose atomizing assembly 20 and the battery assembly 10.

SUMMARY

In view of this, an electronic cigarette battery assembly is provided according to the present application, which overcome the problems in the conventional electronic cigarette that a rechargeable battery has to be removed out of the battery assembly for being charged, which is inconvenient and cause an unreliable electric connection between the atomizing assembly and the battery assembly due to the loose atomizing assembly and the battery assembly.

To achieve the above object, the solution of the present application is provided as follows.

An electronic cigarette battery assembly is provided according to the present application, which forms an electronic cigarette together with an atomizing assembly, and includes:

a battery rod main body including a rechargeable battery and a control module for controlling the charging and discharging of the rechargeable battery; and a charging electrode arranged at an end of the battery rod main body and electrically connected to the control module for delivering electric energy to the rechargeable battery, the charging electrode includes:

an outer electrode, an electrode bracket and an inner electrode, the outer electrode is arranged at the end, is located at an inner side of the end and is fixedly connected to the battery rod main body;

the electrode bracket is made of an electric insulating material, and is arranged at an inner side of the outer electrode and is fixedly connected to the inner side of the outer electrode; and the inner electrode is arranged at an inner side of the electrode bracket, and an outer side of the inner electrode is slidably connected to the electrode bracket, and an end face of the inner electrode is in a spherical cap shape and is located at an end face of the end of the battery rod main body.

Further, the outer electrode is in an annular shape.

Further, a circumferential surface of the outer electrode is provided with a retaining portion for being retained on an end face of the battery rod main body.

Further, an outer end face of the charging electrode is in a spherical cap shape.

Further, an inner wall surface of the electrode bracket is provided with a first position-limiting portion which abuts against the inner electrode for preventing the inner electrode from falling into the battery rod main body, and/or the outer side of the inner electrode is provided with a second position-limiting portion which abuts against the electrode bracket for preventing the inner electrode from slipping off from the electrode bracket in a direction away from the battery rod main body.

Further, the charging electrode further includes an elastic piece abutting against the inner electrode to allow the inner electrode to be elastically stretchable in an axial direction of the battery rod main body.

Further, the charging electrode further includes a fixing plate which is inserted into and connected to the outer electrode, and the elastic piece has one end abutting against the inner electrode and another end abutting against the fixing plate.

Further, the elastic piece is a spring, and the inner electrode is connected to the control module by the spring.

Further, the inner electrode is provided with a protrusion, and at least a part of the spring is arranged at the circumference of the protrusion.

Further, the inner electrode is provided with a recess, and at least a part of the spring is arranged in the recess.

From the above technical solution, it can be seen that the electronic cigarette battery assembly according to the present application includes the charging electrode arranged at the end of the battery assembly. The charging electrode is connected to the rechargeable battery of the battery assembly by the control module. When the rechargeable battery is required to be charged, only the charging electrode is connected to an electric energy output end of an external charger for achieving the charging of the rechargeable battery and it is not necessary to remove the rechargeable battery out of the battery assembly and disassemble the battery assembly and the atomizing assembly, which facilitates the use of the electronic cigarette. That is, the problems, that the rechargeable battery has to be removed out of the battery assembly to be charged, in the conventional electronic cigarette can be overcome, which may otherwise my inconvenient and cause an unreliable electric connection between the atomizing assembly and the battery assembly due to the loose atomizing assembly and the battery assembly.

Further, since the inner electrode is arranged at the inner side of the electrode bracket and is slidably connected to the electrode bracket and the inner electrode has an end face of a spherical cap shape, the inner electrode is more easily to be aligned and in contact with an electric energy output end of an external charging equipment when the rechargeable battery is being charged. Especially when the battery assembly is to be socketed to a charging equipment to be charged, the inner electrode slidably connected to the electrode bracket is easily to be electrically connected to the charging equipment, and the outer electrode may also be allowed to have a good electrical connection to the charging equipment, which ensures a reliable charging. Also, dirt is not apt to be accumulated at the spherical cap-shaped end face of the charging electrode.

BRIEF DESCRIPTION OF THE DRAWINGS

For more clearly illustrating embodiments of the present application or technical solutions in the conventional technology, drawings referred to describe the embodiments or the conventional technology will be briefly described hereinafter. Apparently, the drawings in the following description are only some examples of the present application, and for those skilled in the art, other drawings may be obtained based on these drawings without any creative efforts.

DETAILED DESCRIPTION

The technical solutions of the embodiments of the present application will be described clearly and completely hereinafter in conjunction with the drawings of the embodiments of the present application. Apparently, the embodiments described are only some examples of the present application, and not all implementation. Other embodiments obtained by those skilled in the art based on the embodiments of the present application without any creative efforts all fall into the scope of the present application.

First Embodiment

Figure 1:
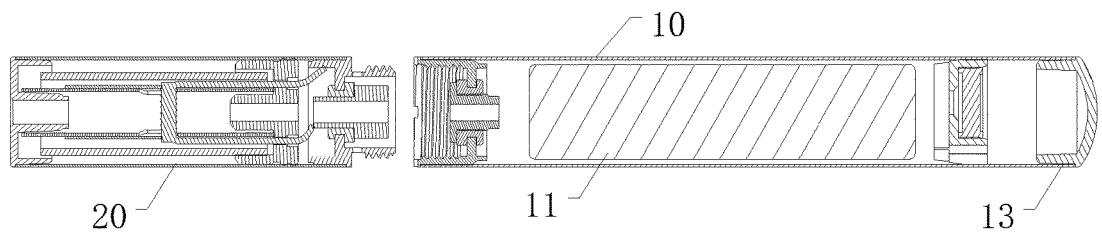
FIG. 1 is a view showing the structure of an electronic cigarette in the conventional technology.
Figure 2:
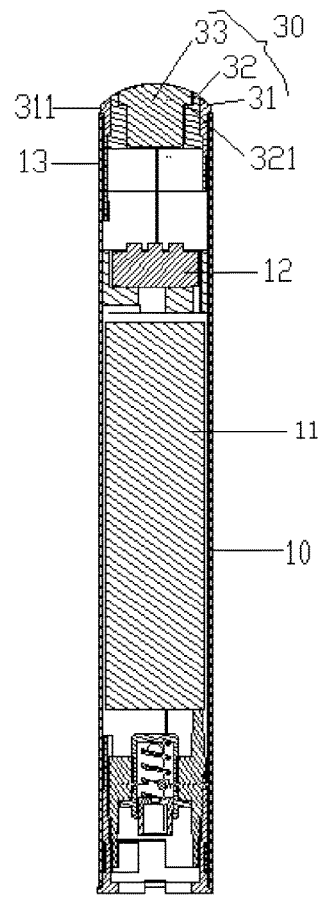
FIG. 2 is a view showing the structure of an electronic cigarette battery assembly according to an embodiment of the present application.

FIG. 2 is a view showing the structure of an electronic cigarette battery assembly forming an electronic cigarette together with an atomizing assembly according to an embodiment of the present application.

As shown in FIG. 2, the battery assembly according to this embodiment includes a battery rod main body 10 and a charging electrode 30 located at an end 13 of the battery rod main body 10. Another end of the battery rod main body 10 is connected to the atomizing assembly.

The battery rod main body 10 includes a rechargeable battery 11 and a control module 12 for controlling the charging and discharging of the rechargeable battery 11.

The charging electrode 30 is connected to the control module 12, and the control module 12 is also connected to the rechargeable battery 11.

The charging electrode 30 includes an outer electrode 31, an electrode bracket 32 and an inner electrode 33. The outer electrode 31 is in an annular shape and arranged at the end 13 of the battery rod main body 10. The outer electrode 31 is fixedly connected to an inner side of the battery rod main body 10 by glue or the like. The circumferential surface of the outer electrode 31 is provided with a retaining portion 311, which is retained on an end face of the battery rod main body 10. By providing the retaining portion 311, the outer electrode 31 may be prevented from falling into the battery rod main body 10.

The electrode bracket 32 is arranged at an inner side of the outer electrode 31 and fixedly connected to the outer electrode 31. An inner wall surface of the electrode bracket 32 is provided with a first position-limiting portion 321, which abuts against the inner electrode 33 so as to prevent the inner electrode 33 from falling into the battery rod main body 10. When the inner electrode 33 moves toward another end of the battery assembly in an axial direction of the battery assembly due to an external force caused by a dropping battery assembly, the position of the inner electrode 33 is limited by the first position-limiting portion 321, thus preventing the inner electrode 33 from falling into the battery rod main body 10.

The inner electrode 33 is arranged at an inner side the electrode bracket 32 and slidably connected to the electrode bracket 32. The outer electrode 31 and the inner electrode 33 are connected to the control module 12 of the electronic cigarette by wires.

An end face of the inner electrode 33 is in a spherical cap shape, and is located at an end face of the end 13 of the battery rod main body 10 for being connected to an electric energy output end of external charging equipment.

The electrode bracket 32 is made of an electric insulating material, such as a plastic or ceramic material, etc. Herein, the material of the electrode bracket 32 is not limited. An outer end face of the charging electrode 30 is in a spherical cap shape.

When the rechargeable battery 11 needs to be charged, only the charging electrode 30 is required to be connected to an electric energy output end of an external charger for achieving the charging of the rechargeable battery 11.

From the above technical solution, it can be seen that the electronic cigarette battery assembly according to this embodiment includes the charging electrode 30. The charging electrode 30 is connected to the rechargeable battery 11 of the electronic cigarette by the control module 12. When the rechargeable battery 11 needs to be charged, only the charging electrode 30 is required to be connected to an electric energy output end of an external charger for achieving the charging of the rechargeable battery 11, that is, it is not necessary to remove the rechargeable battery 11 out of the battery assembly 10, which facilitates the use of the electronic cigarette. That is, the problems that, the rechargeable battery 11 has to be removed out of the battery assembly 10 to be charged, in the conventional electronic cigarette can be overcome, which may otherwise be inconvenient and has an unreliable electric connection.

Further, since the inner electrode 33 is arranged at the inner side of the electrode bracket 32 and is slidably connected to the electrode bracket 32 and the end face of the inner electrode 33 is in the spherical cap shape, the inner electrode 33 is more easily to be aligned and in contact with an electric energy output end of an external charging equipment when the rechargeable battery 11 is being charged. Especially when the battery assembly is socketed on a charging equipment for being charged, the inner electrode 33 slidably connected to the electrode bracket 32 is easy to be electrically connected to the charging equipment, and the outer electrode 31 may also be allowed to have a good electrical connection to the charging equipment, which ensures a reliable charging. Also, dirt is not apt to be accumulated on the spherical cap-shaped end face of the charging electrode 30, which ensures the reliable charging.

Furthermore, the outer electrode 31 is in the annular shape, which also increases the contact area of the charging electrode 30 and the electric energy output end of the external charging equipment, achieving a more full contact and a better charging effect.

Second Embodiment

Figure 3:
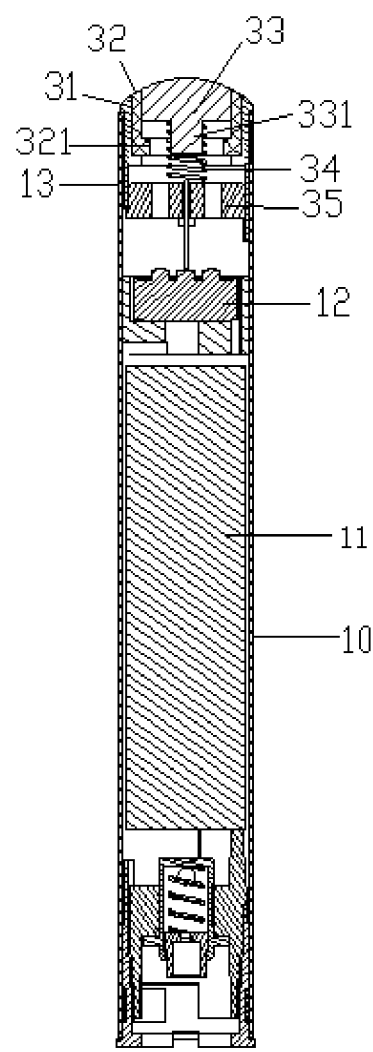
FIG. 3 is a view showing the structure of an electronic cigarette battery assembly according to another embodiment of the present application.

FIG. 3 is a view showing the structure of an electronic cigarette battery assembly according to another embodiment of the present application.

As shown in FIG. 3, a charging electrode 30 of the battery assembly according to this embodiment further includes an elastic piece and a fixing plate 35. The elastic piece abuts against the inner electrode 33 to allow the inner electrode 33 to be elastically stretchable in an axial direction of the battery rod main body 10. The fixing plate 35 is inserted into and connected to the outer electrode 31. The elastic piece has one end abutting against the inner electrode 33 and another end abutting against the fixing plate 35. In this embodiment, the elastic piece is a spring. That is, the battery assembly according to this embodiment is that a spring 34 is added in the battery assembly according to the above embodiment. Apparently, the elastic piece may also be an elastic sheet or an elastic soft rubber block, etc., which is not limited herein. In this embodiment, the spring 34 also functions to connect the inner electrode 33 and the control module 12.

A protrusion 331 is provided at a bottom of the inner electrode 33. The circumference of the protrusion 331 is surrounded by a part of the spring 34 and is connected to the control module 12.

By providing the spring 34, the inner electrode 33 slidably connected to the electrode bracket 32 may be allowed to be stretchable when in a charging process, which allows the inner electrode 33 to be in a better contact with the electric energy output end of the external charger during the connection, and prevents a poor charging effect due to a poor contact.

Since the outer electrode 31 is inserted into and connected to the fixing plate 35, the charging electrode 30, which has been assembled, is inserted into the battery rod main body 10 when the battery assembly is assembled. Therefore, the assembling process is convenient and production efficiency is improved.

Third Embodiment

Figure 4:
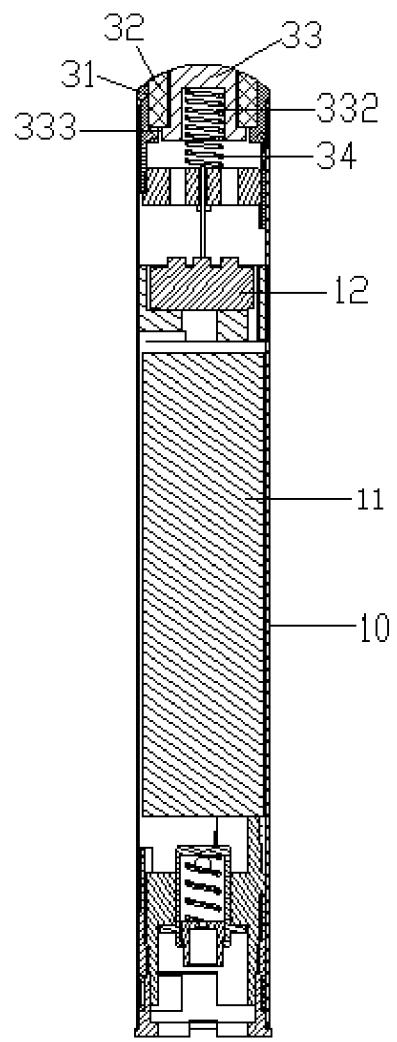
FIG. 4 is a view showing the structure of an electronic cigarette battery assembly according to yet another embodiment of the present application.

FIG. 4 is a view showing the structure of an electronic cigarette battery assembly according to yet another embodiment of the present application.

As shown in FIG. 4, the spring 34 in the above embodiment is remained in the battery assembly according to this embodiment.

The spring 34 functions to connect the inner electrode 33 and the control module 12.

The difference between the battery assembly according to this embodiment and the battery assembly according to the previous embodiment lies in that a recess 332 is provided at the bottom of the inner electrode 33 and a second position-limiting portion 333 is provided at an outer side of the inner electrode 33. The second position-limiting portion 333 abuts against the electrode bracket 32 so as to prevent the inner electrode 33 from slipping off from the electrode bracket 32 in a direction away from the battery rod main body 10. A part of the spring 34 extends into the recess 332, and is connected to the control module 12. By providing the spring 34, the inner electrode 33 slidably connected to the electrode bracket 32 can be extended in the charging process, which allows the inner electrode 33 to be in a better contact with the electric energy output end of the external charger during the connection, and avoids a poor charging effect due to a poor contact. By providing the second position-limiting portion 333, the inner electrode 33 can be more reliably connected.

Finally, it should also be noted that the relationship terminologies such as "first", "second" and the like are only used herein to distinguish one entity or operation from another, rather than necessitate or imply that the actual relationship or order exists between the entities or operations. Furthermore, terms of "include", "comprise" or any other variants are intended to be non-exclusive. Therefore, a process, method, article or device including a plurality of components includes not only the listed components but also other components that are not enumerated, or, also include the components inherent for the process, method, article or device. Without other limitations, the component defined by the statement "comprising (including) one . . . " does not exclude the case that other similar components may exist in the process, method, article or device having the above component.

The embodiments in the specification are described in a progressive manner. Each of the embodiments is mainly focused on describing its differences from other embodiments, and references may be made among these embodiments with respect to the same or similar portions among these embodiments.

Based on the above description of the disclosed embodiments, the person skilled in the art is capable of carrying out or using the present application. It is obvious for the person skilled in the art to make many modifications to these embodiments. The general principle defined herein may be applied to other embodiments without departing from the spirit or scope of the present application. Therefore, the present application is not limited to these embodiments illustrated herein, but should be defined by the broadest scope consistent with the principle and novel features disclosed herein.

The invention claimed is:

1. An electronic cigarette battery assembly for forming an electronic cigarette together with an atomizing assembly, the battery assembly comprising:
   a battery rod main body comprising a rechargeable battery and a control module for controlling the charging and discharging of the rechargeable battery; and
   a charging electrode arranged at an end of the battery rod main body and electrically connected to the control module for delivering electric energy to the rechargeable battery, wherein
   the charging electrode comprises:
      an outer electrode, which is arranged at the end, located at an inner side of the end, and fixedly connected to the battery rod main body;
      an electrode bracket, which is made of an electric insulating material, arranged at an inner side of the outer electrode, and fixedly connected to the inner side of the outer electrode; and
      an inner electrode arranged at an inner side of the electrode bracket,
         wherein an outer side of the inner electrode is slidably connected to the electrode bracket, and
         an end face of the inner electrode is in a spherical cap shape and located at an end face of the end of the battery rod main body.

2. The battery assembly according to claim 1, wherein the outer electrode is in an annular shape.

3. The battery assembly according to claim 1, wherein a circumferential surface of the outer electrode is provided with a retaining portion for being retained on an end face of the battery rod main body.

4. The battery assembly according to claim 1, wherein an outer end face of the charging electrode is in a spherical cap shape.

5. The battery assembly according to claim 1, wherein an inner wall surface of the electrode bracket is provided with a first position-limiting portion, which abuts against the inner electrode for preventing the inner electrode from falling into the battery rod main body,
   and/or,
   the outer side of the inner electrode is provided with a second position-limiting portion, which abuts against the electrode bracket for preventing the inner electrode from slipping off from the electrode bracket in a direction away from the battery rod main body.

6. The battery assembly according to claim 1, wherein the charging electrode further comprises an elastic piece abutting against the inner electrode, which allows the inner electrode to be elastically stretchable in an axial direction of the battery rod main body.

7. The battery assembly according to claim 6, wherein the charging electrode further comprises a fixing plate which is inserted into and connected to the outer electrode, and the elastic piece has one end abutting against the inner electrode and another end abutting against the fixing plate.

8. The battery assembly according to claim 6, wherein the elastic piece is a spring, and the inner electrode is connected to the control module by the spring.

9. The battery assembly according to claim 8, wherein the inner electrode is provided with a protrusion, and
   at least a part of the spring is arranged at the circumference of the protrusion.

10. The battery assembly according to claim 8, wherein the inner electrode is provided with a recess, and
    at least a part of the spring is arranged in the recess.

11. The battery assembly according to claim 2, wherein a circumferential surface of the outer electrode is provided with a retaining portion for being retained on an end face of the battery rod main body.

12. The battery assembly according to claim 2, wherein an outer end face of the charging electrode is in a spherical cap shape.

13. The battery assembly according to claim 2, wherein an inner wall surface of the electrode bracket is provided with a first position-limiting portion, which abuts against the inner electrode for preventing the inner electrode from falling into the battery rod main body,
    and/or,
    the outer side of the inner electrode is provided with a second position-limiting portion, which abuts against the electrode bracket for preventing the inner electrode from slipping off from the electrode bracket in a direction away from the battery rod main body.

14. The battery assembly according to claim 2, wherein the charging electrode further comprises an elastic piece abutting against the inner electrode, which allows the inner electrode to be elastically stretchable in an axial direction of the battery rod main body.

* * * * *